US 11,494,290 B2

United States Patent
Walters et al.

(10) Patent No.: US 11,494,290 B2
(45) Date of Patent: Nov. 8, 2022

(54) UNSUPERVISED INTEGRATION TEST BUILDER

(71) Applicant: Capital One Services, LLC, McLean, VA (US)

(72) Inventors: Austin Walters, Savoy, IL (US); Jeremy Goodsitt, Champaign, IL (US); Fardin Abdi Taghi Abad, Champaign, IL (US); Mark Watson, Urbana, IL (US); Anh Truong, Champaign, IL (US); Reza Farivar, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/026,461

(22) Filed: Sep. 21, 2020

(65) Prior Publication Data
US 2021/0157714 A1    May 27, 2021

Related U.S. Application Data

(63) Continuation of application No. 16/697,561, filed on Nov. 27, 2019, now Pat. No. 10,783,064.

(51) Int. Cl.
*G06F 9/44*    (2018.01)
*G06F 9/455*    (2018.01)
(Continued)

(52) U.S. Cl.
CPC ....... *G06F 11/3684* (2013.01); *G06N 3/0445* (2013.01); *G06N 3/086* (2013.01)

(58) Field of Classification Search
CPC ............. G06F 11/3668; G06F 11/3672; G06F 11/3664; G06F 11/3684; G06N 3/0445; G06N 3/086
See application file for complete search history.

(56) References Cited

U.S. PATENT DOCUMENTS 9,906,542 B2 *    2/2018  Boia ................... H04L 63/1425
10,459,962 B1 *    10/2019  Jayaraman ............... G06N 3/08
(Continued)

FOREIGN PATENT DOCUMENTS

CN    105787100 A    *    7/2016

OTHER PUBLICATIONS

Du Chen, A Recurrent Neural Network Based Approach for Web Service QoS Prediction, May 2019. pp. 350-357. https://ieeexplore.ieee.org/stamp/stamp.jsp?arnumber=8837006 (Year: 2019).*

(Continued)

*Primary Examiner* — Mongbao Nguyen
(74) *Attorney, Agent, or Firm* — DLA Piper LLP (US)

(57) ABSTRACT

A system and method of generating one or more integration tests are disclosed herein. A computing system receives a URL from a client device. The URL corresponds to a website hosted by a third party server. The computing system generates a recurrent neural network model for testing of the website. The one or more variables associated with the recurrent neural network model are defined by a genetic algorithm. The computing system inputs code associated with the website into the recurrent neural network model. The recurrent neural network model learns a plurality of possible paths through the website by permutating through each possible set of options on the website. The recurrent neural network mode generates, as output, a plurality of integration tests for at least the test website. The computing system compiles the plurality of integration tests into a format compatible with a testing service specified by the client device.

20 Claims, 5 Drawing Sheets

(51) Int. Cl.
    *G06F 11/36*     (2006.01)
    *G06N 3/08*     (2006.01)
    *G06N 3/04*     (2006.01)

(56) References Cited

U.S. PATENT DOCUMENTS

| | | |
|---|---|---|
| 2005/0086643 A1 | 4/2005 | Shane |
| 2009/0006897 A1 | 1/2009 | Sarsfield |
| 2015/0169432 A1* | 6/2015 | Sinyagin ............ G06F 11/3684 717/124 |
| 2015/0254555 A1* | 9/2015 | Williams, Jr. ....... G06N 3/0454 706/14 |
| 2015/0339213 A1 | 11/2015 | Lee et al. |
| 2016/0110657 A1* | 4/2016 | Gibiansky ............ G06N 20/00 706/12 |
| 2017/0193367 A1 | 7/2017 | Miikkulainen et al. |
| 2017/0193403 A1 | 7/2017 | Iscoe et al. |
| 2018/0240041 A1* | 8/2018 | Koch ................ G06F 16/24578 |
| 2018/0253408 A1 | 9/2018 | Severn |
| 2018/0260309 A1 | 9/2018 | Simoni |
| 2018/0285186 A1* | 10/2018 | Godefroid .......... G06F 11/3684 |
| 2018/0285740 A1* | 10/2018 | Smyth ................. G06N 3/0454 |
| 2018/0349256 A1 | 12/2018 | Fong |
| 2018/0365139 A1* | 12/2018 | Rajpal .................. G06F 21/577 |
| 2019/0004934 A1 | 1/2019 | Huchegowda et al. |
| 2019/0122258 A1* | 4/2019 | Bramberger ....... G06Q 30/0248 |
| 2019/0188117 A1 | 6/2019 | Liu et al. |
| 2019/0196950 A1 | 6/2019 | Ranganathan et al. |
| 2019/0278699 A1 | 9/2019 | Sharma et al. |
| 2019/0384699 A1* | 12/2019 | Arbon ................... G06N 3/006 |
| 2019/0384790 A1 | 12/2019 | Bequet et al. |
| 2020/0117580 A1 | 4/2020 | Lekivetz et al. |
| 2020/0234162 A1* | 7/2020 | Jayaraman ............ G06N 20/00 |
| 2020/0336507 A1* | 10/2020 | Lee ...................... G06K 9/6269 |
| 2021/0092144 A1* | 3/2021 | Qualls ................. G06F 11/3688 |
| 2021/0120013 A1* | 4/2021 | Hines ...................... G06N 3/08 |
| 2021/0271455 A1* | 9/2021 | Svyatkovskiy ...... G06N 3/0445 |

OTHER PUBLICATIONS

Om Prakash Patel, Advanced Quantum Based Neural Network Classifier and Its Application for Objectionable, Aug. 2019, pp. 98069-98080. https://ieeexplore.ieee.org/stamp/stamp.jsp?tp=&arnumber=8756075 (Year: 2019).*
Nashat Mansour, Genetic Algorithm for Testing Web Applications, 2018, pp. 1-19. https://www.researchgate.net/publication/326944168_Genetic_Algorithm_for_Testing_Web_Applications (Year: 2018).*
Sablotny, et al., "Recurrent Neural Networks for Fuzz Testing Web Browsers", https://arxiv.org/pdf/1812.04851.pdf, 2018, pp. 1-17.
Santiago, et al., "Abstract Flow Learning for Web Application Test Generation", https://dl.acm.org/doi/pdf/10.1145/3278186.3278194, 2018, pp. 49-55.

* cited by examiner

UNSUPERVISED INTEGRATION TEST BUILDER

CROSS-REFERENCE TO RELATED APPLICATION INFORMATION

This is a continuation of U.S. patent application Ser. No. 16/697,561, filed Nov. 27, 2019, which is incorporated herein by reference in its entirety.

FIELD OF THE DISCLOSURE

The present disclosure generally relates to a system and method of generating integration tests for a website.

BACKGROUND

Testing a website through a web interface is often difficult, either requiring testers to manually test the site, developers building integration tests, or merely skipping the tests altogether. Such operations are typically costly, as it takes either a long time to build unit tests, or companies lose money for having broken site links, forms, and the like.

SUMMARY

In some embodiments, a method of generating one or more integration tests is disclosed herein. A computing system receives a uniform resource locator (URL) from a client device. The URL corresponds to a website hosted by a third party server. The computing system generates a recurrent neural network model for testing of the website. The one or more variables associated with the recurrent neural network model are defined by a genetic algorithm. The computing system inputs code associated with the website into the recurrent neural network model. The recurrent neural network model learns a plurality of possible paths through the website by permutating through each possible set of options on the website. The recurrent neural network mode generates, as output, a plurality of integration tests for at least the test website. The computing system compiles the plurality of integration tests into a format compatible with a testing service specified by the client device.

In some embodiments, the computing system uploads the plurality of integration tests in the compatible format into the testing service specified by the client device.

In some embodiments, the computing system receives, from the client device, a second URL corresponding to a web page. The computing system inputs code associated with the second URL into the recurrent neural network model. The recurrent neural network identifies a second plurality of possible permutations through the web page, based on the learned plurality of possible permutations.

In some embodiments, the computing system receives, from the client device, a second URL corresponding to an update of a web page of the website. The computing system inputs code associated with the second URL into the recurrent neural network model. The recurrent neural network identifies a plurality of additional possible permutations through the web page. The plurality of additional possible permutations are distinct from the plurality of permutations prior to the update.

In some embodiments, the computing system executes the one or more integration tests on the update of the web page.

In some embodiments, learning, by the recurrent neural network model, the plurality of possible permutations through the website by permutating through each possible set of options on the website includes learning one or more possible paths through the website to not take for future testing.

In some embodiments, the computing system receives, from the client device, a second URL corresponding to a web page. The computing system inputs code associated with the second URL into the recurrent neural network model. The recurrent neural network identifies a second plurality of possible permutations through the web page, based on the learned plurality of possible permutations by skipping one or more sets of options of the webpage that lead to dead ends.

In some embodiments, the one or more variables include a speed of switching between states on the website.

In some embodiments, a system is disclosed herein. The system includes a processor and a memory. The memory has programming instructions stored thereon, which, when executed by the processor, perform one or more operations. The one or more operations include generating a plurality of integration tests. Generating a plurality of integration tests comprises receiving a uniform resource locator (URL) from a client device, the URL corresponding to a test website, generating a recurrent neural network model for testing of the test website, wherein one or more variables associated with the recurrent neural network model are defined by a genetic algorithm, inputting associated with the test website into the recurrent neural network model, learning, by the recurrent neural network model, a plurality of possible paths through the test website by permutating through each possible set of options on the website, and outputting, by the recurrent neural network model, the plurality of integration tests. The one or more operations further include testing a candidate website using the plurality of integration tests. Testing the candidate website using the plurality of integration tests comprises compiling the plurality of integration tests into a format compatible with a testing service and executing the plurality of integration tests in the compatible format on code associated with the candidate website.

In some embodiments, the one or more operations further include receiving, from the client device, a second URL corresponding to a web page, inputting code associated with the second URL into the recurrent neural network model, and identifying, by the recurrent neural network, a second plurality of possible permutations through the web page, based on the learned plurality of possible permutations.

In some embodiments, the one or more operations further include receiving, from the client device, a second URL corresponding to an update of a web page of the website, inputting code associated with the second URL into the recurrent neural network model, and identifying a plurality of additional possible permutations through the web page. The plurality of additional possible permutations are distinct from the plurality of permutations prior to the update.

In some embodiments, the one or more operations further include executing the one or more integration tests on the update of the web page.

In some embodiments, learning, by the recurrent neural network model, the plurality of possible permutations through the website by permutating through each possible set of options on the website includes learning one or more possible paths through the website to not take for future testing.

In some embodiments, the one or more operations further include receiving, by the computing system from the client device, a second URL corresponding to a web page, inputting, by the computing system, code associated with the second URL into the recurrent neural network model, and identifying, by the recurrent neural network, a second plurality of possible permutations through the web page, based on the learned plurality of possible permutations by skipping one or more sets of options of the webpage that lead to dead ends.

In some embodiments, the one or more variables include a speed of switching between states on the website.

In some embodiments, a non-transitory computer-readable medium is disclosed herein. The non-transitory computer-readable medium includes one or more sequences of instructions that, when executed by one or more processors, causes one or more operations. A computing system receives a uniform resource locator (URL) from a client device. The URL corresponds to a website hosted by a third party server. The computing system generates a recurrent neural network model for testing of the website. The one or more variables associated with the recurrent neural network model are defined by a genetic algorithm. The computing system inputs code associated with the website into the recurrent neural network model. The recurrent neural network model learns a plurality of possible paths through the website by permutating through each possible set of options on the website. The recurrent neural network model generates, as output, a plurality of integration tests for at least the test website. The computing system compiles the plurality of integration tests into a format compatible with a testing service specified by the client device.

In some embodiments, the computing system uploads the plurality of integration tests in the compatible format into the testing service specified by the client device.

In some embodiments, the computing system receives, from the client device, a second URL corresponding to a web page. The computing system inputs code associated with the second URL into the recurrent neural network model. The recurrent neural network identifies a second plurality of possible permutations through the web page, based on the learned plurality of possible permutations.

In some embodiments, the computing system receives, from the client device, a second URL corresponding to an update of a web page of the website. The computing system inputs code associated with the second URL into the recurrent neural network model. The recurrent neural network identifies a plurality of additional possible permutations through the web page. The plurality of additional possible permutations are distinct from the plurality of permutations prior to the update.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques disclosed herein generally relate to a system and method of generating integration tests for a website. Building integration tests for a website is conventionally time consuming, costly, and always changing. One or more techniques described herein eliminates these issues by using a combination of genetic algorithms, recurrent neural networks (RNNs), and prior knowledge of state (e.g., prior genetic version of the website) to generate integration tests automatically, with little or no user interaction. For example, one or more techniques disclosed herein involve implementing an algorithm that randomly selects web elements and attempts to interact with those web elements (e.g., testing user log-in attempts). Over time, the algorithm may learn various "paths" through the website, generating tests, and identifying broken links, dead ends, and the like.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
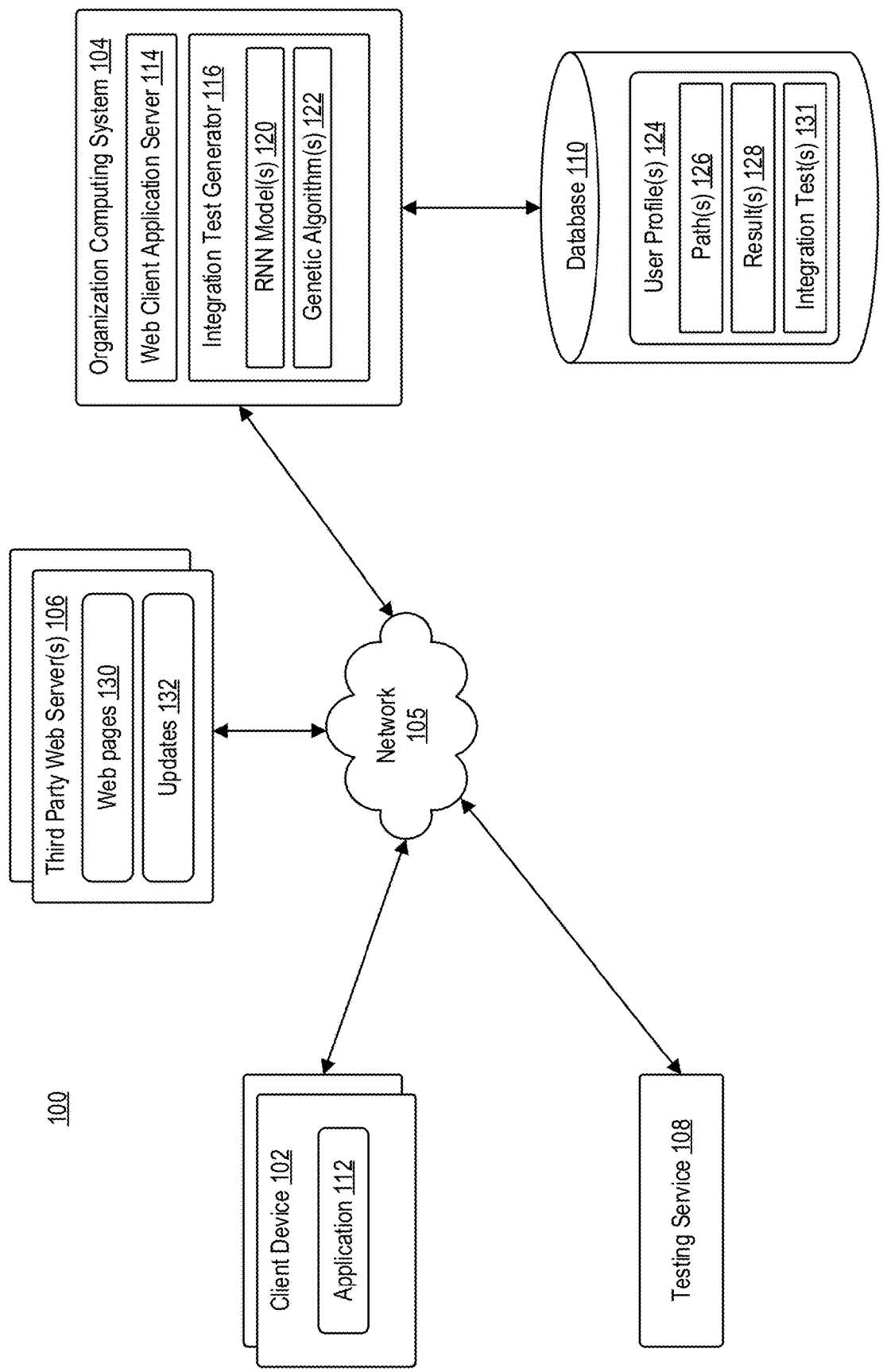
FIG. 1 is a block diagram illustrating a computing environment, according to example embodiments.

FIG. 1 is a block diagram illustrating a computing environment 100, according to one embodiment. Computing environment 100 may include at least a client device 102, an organization computing system 104, one or more third party web servers 106 (hereinafter "third party web server 106"), a testing service 110, and a database 110 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of system 100.

Client device 102 may be operated by a user. For example, client device 102 may be a mobile device, a tablet, a desktop computer, or any computing system having the capabilities described herein. Client device 102 may belong to or be provided to a user or may be borrowed, rented, or shared. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104. Generally, client device 102 may be associated with third party web server 106.

Client device 102 may include at least application 112. Application 112 may be representative of a web browser that allows access to a website or a stand-alone application. Client device 102 may access application 112 to access functionality of organization computing system 104. For example, client device 102 may access application 112 to access an integration test generator 116 hosted by organization computing system 104.

Further, client device 102 may communicate over network 105 to request a webpage, for example, from third party web server 106. For example, client device 102 may be configured to execute application 112 to access content managed by web third party web server 106. The content that is displayed to client device 102 may be transmitted from third party web server 106 to client device 102, and subsequently processed by application 112 for display through a graphical user interface of client device 102.

Organization computing system 104 may include at least web client application server 114 and integration test generator 116. Integration test generator 116 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

Integration test generator 116 may be configured to analyze a web site uploaded by a user (e.g., client device 102), and generate an integration test based on the analysis. For example, integration test generator 116 may be configured to generate an integration test with little or no input from the user. Integration test generator 116 may include one or more recurrent neural network (RNN) models 120 (hereinafter "RNN model 120") and one or more genetic algorithms 122 (hereinafter "genetic algorithms 122").

RNN model 120 may be configured to maintain a current and previous states of a given website. For example, RNN model 120 may be trained by integration test generator 116. Integration test generator 116 may train RNN model 120 by providing RNN model 120 with a plurality of scripts for a plurality of web sites. RNN model 120 may analyze the scripts for the plurality of websites to identify one or more paths contained in the website. For example, given a certain web page of a website, RNN model 120 may learn the various ways a user may interact with the web page, the various locations a user can navigate from the web page, various dead ends of the web page, and the like. Further, RNN model 120 may learn how to determine which paths were previously taken through the website, such that RNN model 120 does not repeat paths. Accordingly, once trained, RNN model 120 may be able to iterate through all possible paths of a website, while being cognizant of the current state of the website and previous states of the website.

Genetic algorithms 122 may be configured to inject randomness into the analysis performed by RNN model 120. In other words, genetic algorithms 122 may provide hyperparameter tuning of RNN model 120. For example, in some embodiments, genetic algorithms 122 may define the speed at which RNN model 120 simulates a user clicking through a web site. In some embodiments, genetic algorithms 122 may define a number of layers in RNN model 120. In some embodiments, genetic algorithms 122 may define a speed at which RNN model 120 switches between states (e.g., one second). In some embodiments, genetic algorithms 122 may define the number of free variables in RNN model 120. In some embodiments, genetic algorithms 122 may define a number of long short-term memory (LSTM) modules in RNN model 120. in some embodiments, genetic algorithms 122 may define what type of threads are analyzed (e.g., cascading style sheets (CSS), hypertext markup language (HTML), field elements, a combination thereof, and the like). In some embodiments, genetic algorithms 122 may define a depth of the search (e.g., how many states RNN model 120 may iterate through). Generally, genetic algorithms 122 may be defined by an end user via application 112 of client device 102.

In addition to identifying current paths through a website, integration test generator 116 may further be configured to analyze beta pages or updates to a given website. For example, if a user wants to test a beta page or update to a web page prior to rolling out the web page, integration test generator 116 may be able to iterate through the beta page or update to identify any new paths through the website or any broken paths (e.g., dead end) that may be caused by the beta page or update.

As output, integration test generator 116 may generate a plurality of integration tests for the provided website. Integration test generator 116 may compile the plurality of integration tests into a format compatible with a testing service provided by client device 102. Exemplary testing services may include, for example, Selenium, Katalon, Unified Functional Testing (UFT), and the like. In some embodiments, integration test generator 116 may interface directly with a testing service 108 by transmitting the compiled integration tests directly thereto. In some embodiments, integration test generator 116 may provide the compiled integration tests directly to client device 102, thus allowing the end user to interact with testing service 108.

Third party web server 106 may be representative of one or more computing devices configured to host one or more websites. For purposes of this discuss, assume that third party web server 106 is a web server associated with client device 102. Third party web server 106 may include one or more web pages 130 of a web site and one or more updates 132 (or beta pages) of a website. When a user of client device 102, for example, wishes to test a website, user may submit a URL associated with a website hosted by third party web server 106 to integration test generator 116 for analysis. In some embodiments, the URL may be associated with a web page 130 of the one or more web pages. Each update 132 may correspond to a web page that has not been rolled out, or made available to, users on the open Internet. In some embodiments, a user of client device 102 may test updates 132 by providing a URL (e.g., a private URL) to integration test generator 116, such that integration test generator 116 may iterate through the various paths resulting from update 132.

Referring back to organization computing system 104, organization computing system 104 may be associated with database 110. Database 110 may include one or more user profile 124 (hereinafter "user profile 124"). User profile 124 may be associated with a specific end user or an organization that encompasses a plurality of end users. User profile 124 may include one or more paths 126, one or more results 128, and one or more integration tests 131.

Each path 126 may be representative of one possible path through a website hosted by a third part web server 106. Database 110 may maintain paths 126 for a given website, for example, so that integration test generator 116 may determine if an update 132 or beta page breaks a previously determined path. Results 128 may correspond to various results determined by RNN model 120. For example, RNN model 120 may determine that a given update 132 or beta page breaks a previously determined path, that there is a dead end via an existing website path, and the like. For example, RNN model 120 may identify a series of actions, such as selecting form fields and filling in username and passwords, to see if a user can login. In another example, RNN model 120 may identify a set of actions corresponding to a user trying to make an online payment. RNN model 120 may intentionally miss fields in the online payment process to see if the system catches such errors. Essentially, RNN model 120 may learn a series of CSS/id selectors and attempt to utilize them in the analysis. Integration tests 131 may be representative of one or more compiled integration tests generated by integration test generator 116.

Figure 2:
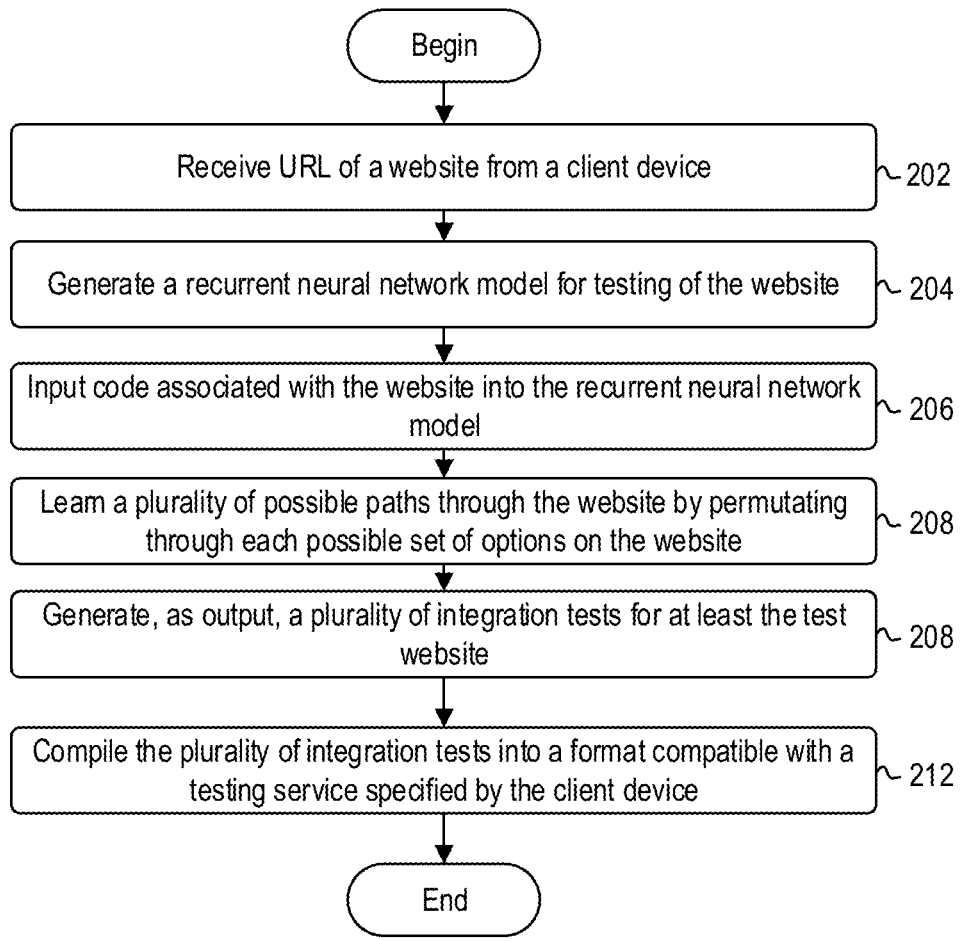
FIG. 2 is a flow diagram illustrating a method of generating an integration test, according to example embodiments.

FIG. 2 is a flow diagram illustrating a method 200 of generating an integration test, according to example embodiments. Method 200 may begin at step 202.

At step 202, organization computing system 104 may receive a uniform resource locator (URL) from client device 102. For example, client device 102 may submit URL for a web page 130 or website hosted by third party web server 106 to organization computing system 104 via application 112 executing thereon.

At step 204, organization computing system 104 may generate an RNN model 120 for testing of the website. In some embodiments, RNN model 120 may be trained prior to receipt of the URL. For example, integration test generator 116 may train RNN model 120 using various websites prior to allowing users access to functionalities thereof. In some embodiments, integration test generator 116 may continually train RNN model 120 as new requests are received. Generally, RNN model 120 may be trained to identify all possible paths through a given website. For example, given input parameters, RNN model 120 may be configured to iterate through every possible option for a given website.

At step 206, organization computing system 104 may input code (e.g., web scripts) associated with the website into RNN model 120. At step 208, RNN model 120 may learn a plurality of possible paths through the website by permutating through each possible set of options on the website. In some embodiments, the way in which RNN model 120 learns the plurality of possible paths is hyper-parameterized by one or more genetic algorithms. For example, integration test generator 116 may tune RNN model 120 via one or more genetic algorithms 122. Genetic algorithms 122 may define the way in which RNN model 120 iterates through the website. In some embodiments, such parameters may be defined by an end user when client device 102 uploads URL to integration test generator 116.

At step 210, organization computing system 104 may generate a plurality of integration test for the website. For example, as a result of RNN model 120 iterating through possible paths of the website, integration test generator 116 may generate one or more integration test for the website.

At step 212, organization computing system 104 may compile the plurality of integration tests into a format compatible with a resting service specified by client device 102. For example, integration test generator 116 may compile the plurality of integration tests into a format compatible with one of Selenium, Katalon, Unified Functional Testing (UFT), and the like.

Figure 3:
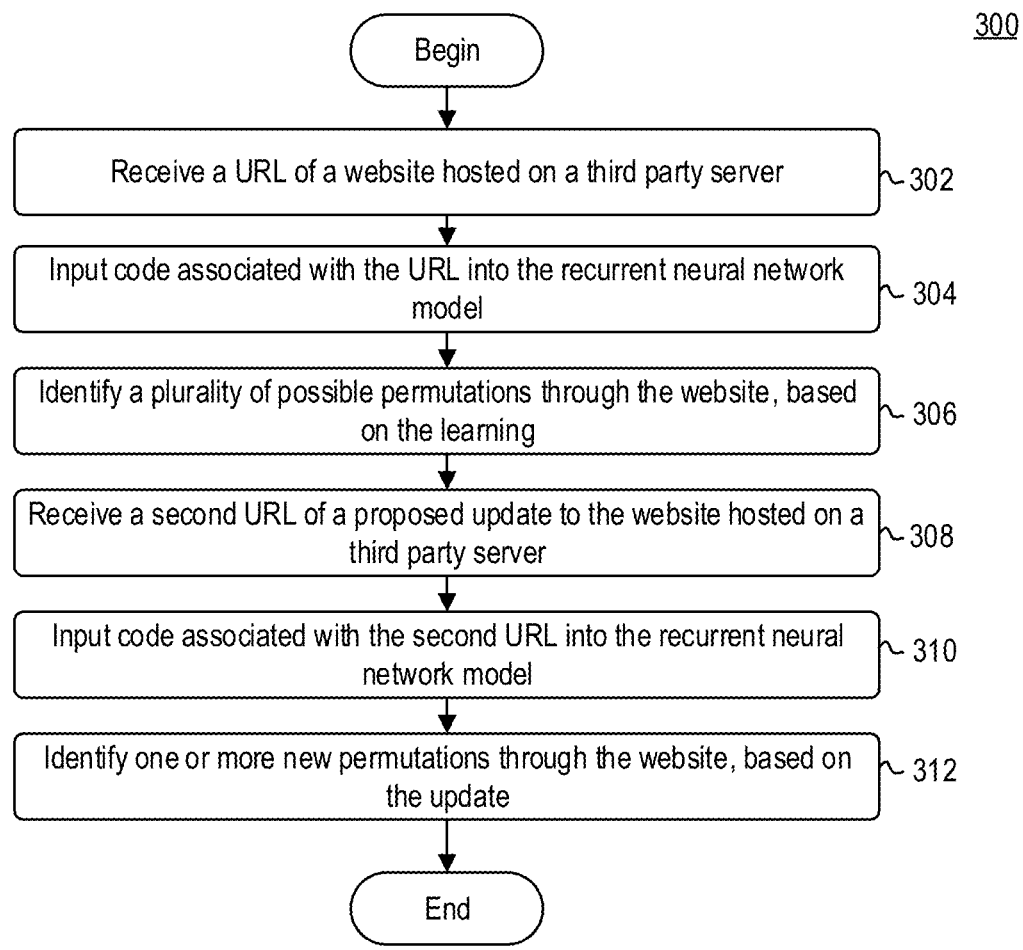
FIG. 3 is a flow diagram illustrating a method of identifying possible paths through a website, according to example embodiments.

FIG. 3 is a flow diagram illustrating a method 300 of identifying possible paths through a website, according to example embodiments. Method 300 may begin at step 302.

At step 302, organization computing system 104 may receive a URL from client device 102. For example, client device 102 may submit URL for a web page 130 or website hosted by third party web server 106 to organization computing system 104 via application 112 executing thereon.

At step 304, organization computing system 104 may input code associated with the website into RNN model 120. At step 306, RNN model 120 may learn a plurality of possible paths through the website by permutating through each possible set of options on the website. In some embodiments, the way in which RNN model 120 learns the plurality of possible paths is hyper-parameterized by one or more genetic algorithms. For example, integration test generator 116 may tune RNN model 120 via one or more genetic algorithms 122. Genetic algorithms 122 may define the way in which RNN model 120 iterates through the website. In some embodiments, such parameters may be defined by an end user when client device 102 uploads URL to integration test generator 116.

At step 308, organization computing system 104 may receive a second URL from client device 102. For example, client device 102 may submit URL for an update 132, or beta page, for website hosted by third party web server 106 to organization computing system 104 via application 112 executing thereon.

At step 310, organization computing system 104 may input code (e.g., web scripts) associated with update 132 into RNN model 120. At step 312, RNN model 120 may learn a plurality of possible new paths through the website by permutating through each possible set of options on the website with update 132 incorporated therein. RNN model 120 may compare determined paths to paths 126 stored in database 110 to determine those paths that are new. In some embodiments, the way in which RNN model 120 learns the plurality of possible paths is hyper-parameterized by one or more genetic algorithms. For example, integration test generator 116 may tune RNN model 120 via one or more genetic algorithms 122. Genetic algorithms 122 may define the way in which RNN model 120 iterates through the website. In some embodiments, such parameters may be defined by an end user when client device 102 uploads URL to integration test generator 116. RNN model 120 may compare determined paths to paths 126 stored in database 110 to determine those paths that are new.

Figure 4:
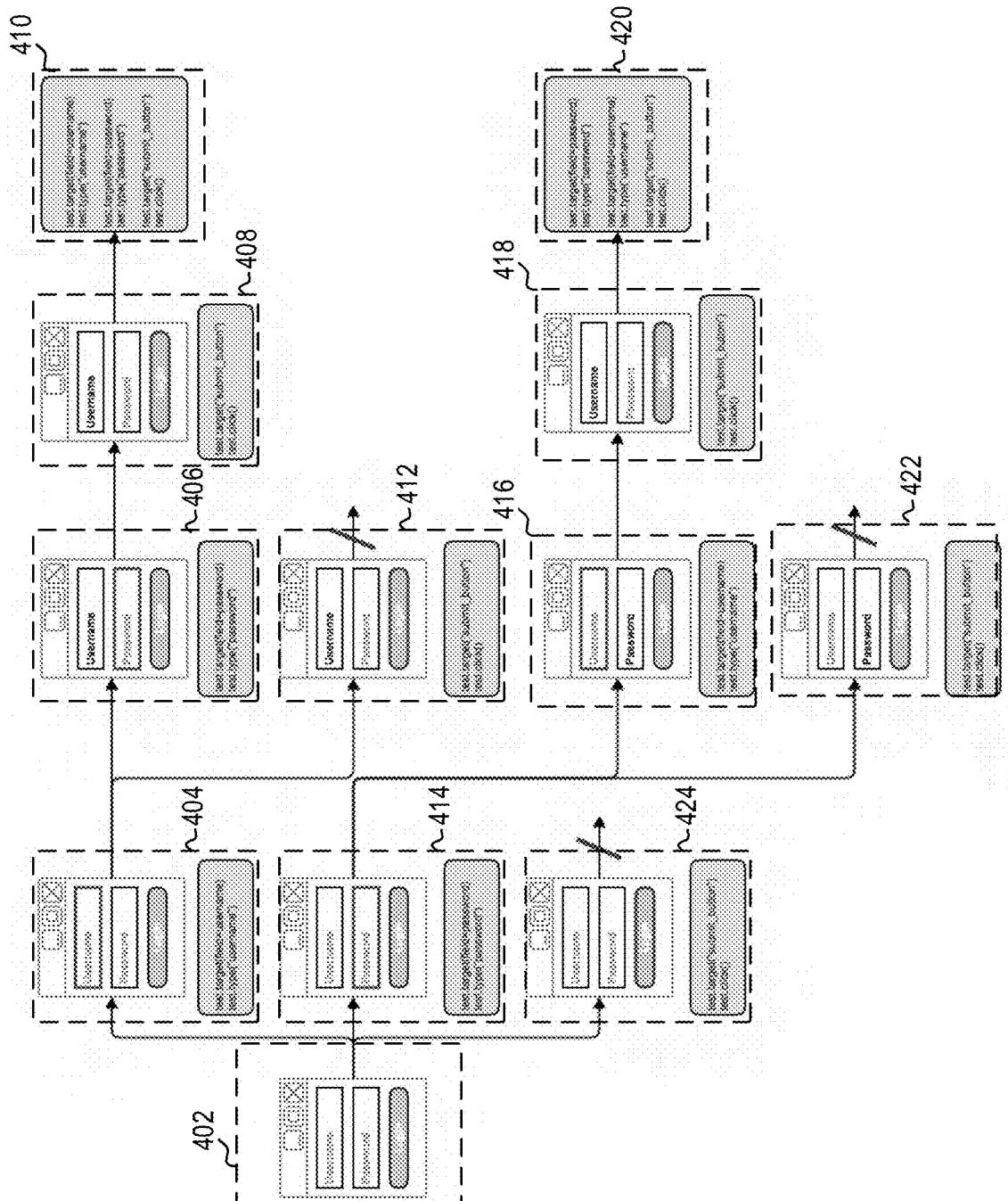
FIG. 4 is a block diagram visually representing various paths through website, according to example embodiments.

FIG. 4 is a block diagram 400 visually representing various paths through website, according to example embodiments. The example provided in block diagram 400 is of a user interacting with a log-in prompt.

As shown, initially, at block 402, the user is presented with a log-in prompt. The log-in prompt includes a username field, a password field, and a login actionable element (e.g., submit button). RNN model 120 may iterate through every possible path given the initial state illustrated in block 402.

From block 402, RNN model 120 may take three paths, illustrated by block 404, block 414, and block 424. In block 404, RNN model 120 first interacts with the username field. For example, RNN model 120 may fill in the username field with a test username. From block 404, RNN model 120 may follow two paths: block 406 and block 412. In block 406, RNN model 120 may interact with the password field. For example, RNN model 120 may fill in the password field with a test password. The only path following block 406 is to proceed to block 408. At block 408, RNN model 120 may interact with the login actionable element. Block 410 may represent a scrip of a successful path. Referring back to block 404, RNN model 120 may subsequently interact with block 412. In block 412, RNN model 120 may interact with the login actionable element, instead of first filling in the password field. As those skilled in the art recognize, such a submission (e.g., a username without a password) would result in an error. Accordingly, such path is a "dead end."

Referring back to block 402, RNN model 120 may proceed to block 414. In block 414, RNN model 120 may first interact with the password field. For example, RNN model 120 may fill in the password field with a test password. From block 414, RNN model 120 may follow two possible paths: block 416 and block 422. In block 416, RNN model 120 may interact with the username field. For example, RNN model 120 may fill in the username field with a test username. The only path following block 416 is to proceed to block 418. At block 408, RNN model 120 may interact with the login actionable element. Block 420 may represent a scrip of a successful path. Referring back to block 414, RNN model 120 may subsequently interact with block 422. In block 422, RNN model 120 may interact with the login actionable element, instead of first filling in the username field. As those skilled in the art recognize, such a submission (e.g., a password without a username) would result in an error. Accordingly, such path is a "dead end."

Referring back to block 402, RNN model 120 may proceed to block 424. In block 424, RNN model 120 may interact with login actionable element, instead of first filling in the username or password fields. As those skilled in the art recognize, such a submission (e.g., no username and no password) would result in an error. Accordingly, such path is a "dead end."

Figure 5:
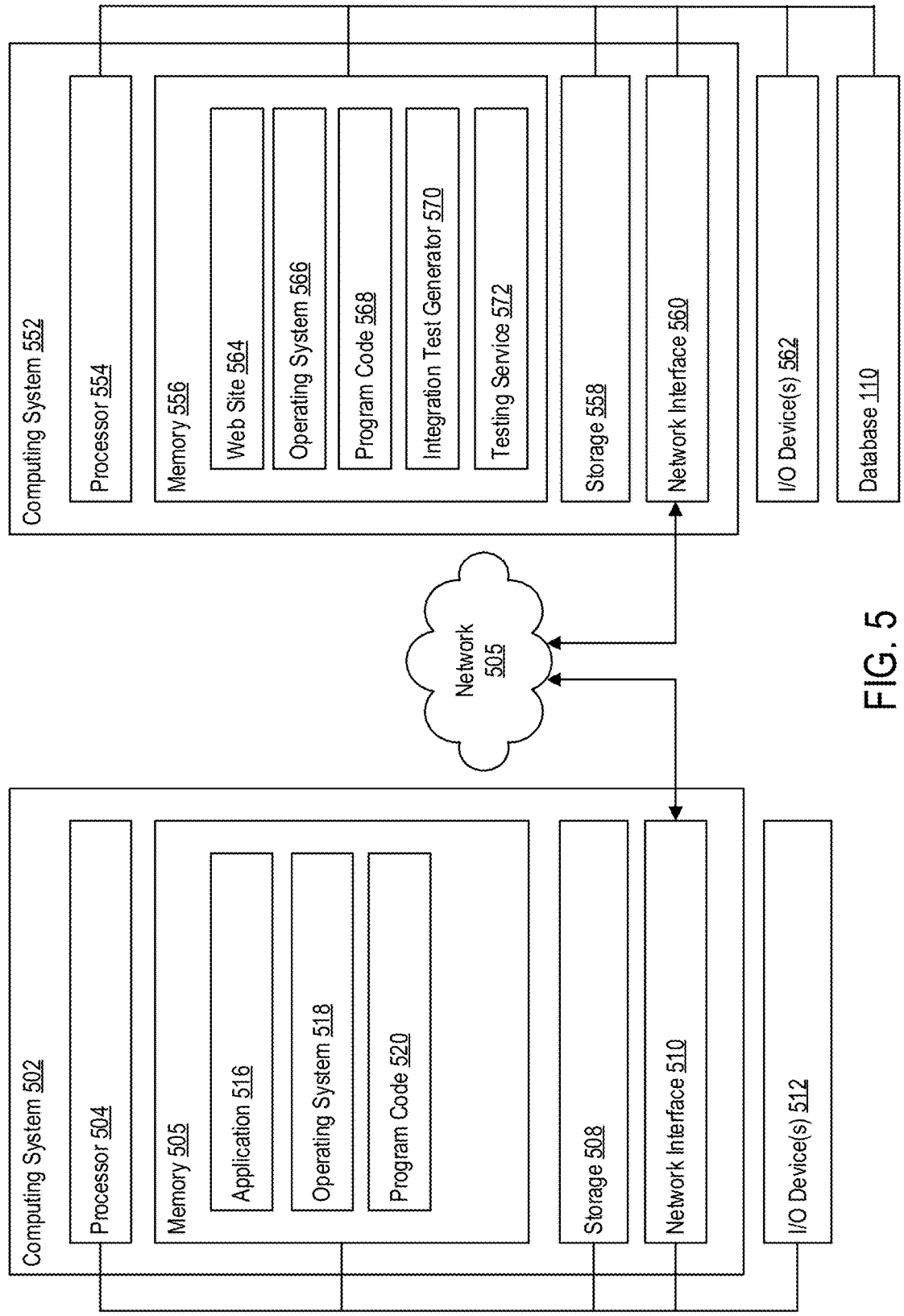
FIG. 5 is a block diagram illustrating a computing environment, according to example embodiments.

FIG. 5 is a block diagram illustrating an exemplary computing environment 500, according to some embodiments. Computing environment 500 includes computing system 502 and computing system 552. Computing system 502 may be representative of client device 102. Computing system 552 may be representative of organization computing system 104.

Computing system 502 may include a processor 504, a memory 506, a storage 508, and a network interface 510. In some embodiments, computing system 502 may be coupled to one or more I/O device(s) 512 (e.g., keyboard, mouse, etc.).

Processor 504 may retrieve and execute program code 520 (i.e., programming instructions) stored in memory 506, as well as stores and retrieves application data. Processor 504 may be included to be representative of a single processor, multiple processors, a single processor having multiple processing cores, and the like. Network interface 510 may be any type of network communications allowing computing system 502 to communicate externally via computing network 505. For example, network interface 510 is configured to enable external communication with computing system 552.

Storage 508 may be, for example, a disk storage device. Although shown as a single unit, storage 508 may be a combination of fixed and/or removable storage devices, such as fixed disk drives, removable memory cards, optical storage, network attached storage (NAS), storage area network (SAN), and the like.

Memory 506 may include application 516, operating system 518, and program code 520. Program code 520 may be accessed by processor 504 for processing (i.e., executing program instructions). Program code 520 may include, for example, executable instructions for communicating with computing system 552 to display one or more pages of website 564. Application 516 may enable a user of computing system 502 to access a functionality of computing system 552. For example, application 516 may access content managed by computing system 552, such as integration test generator 570. The content that is displayed to a user of computing system 502 may be transmitted from computing system 552 to computing system 502, and subsequently processed by application 516 for display through a graphical user interface (GUI) of computing system 502.

Computing system 552 may include a processor 554, a memory 556, a storage 558, and a network interface 560. In some embodiments, computing system 552 may be coupled to one or more I/O device(s) 562. In some embodiments, computing system 552 may be in communication with database 110.

Processor 554 may retrieve and execute program code 566 (i.e., programming instructions) stored in memory 556, as well as stores and retrieves application data. Processor 554 is included to be representative of a single processor, multiple processors, a single processor having multiple processing cores, and the like. Network interface 560 may be any type of network communications enabling computing system 552 to communicate externally via computing network 505. For example, network interface 560 allows computing system 552 to communicate with computer system 502.

Storage 558 may be, for example, a disk storage device. Although shown as a single unit, storage 558 may be a combination of fixed and/or removable storage devices, such as fixed disk drives, removable memory cards, optical storage, network attached storage (NAS), storage area network (SAN), and the like.

Memory 556 may include website 564, operating system 566, program code 568, integration test generator 570, and testing service 572. Program code 568 may be accessed by processor 554 for processing (i.e., executing program instructions). Program code 568 may include, for example, executable instructions configured to perform steps discussed above in conjunction with FIGS. 2-4. As an example, processor 554 may access program code 568 to perform operations related to generating integration test or identifying new paths through a website given an update or beta page. Website 564 may be accessed by computing system 502. For example, website 564 may include content accessed by computing system 502 via a web browser or application.

Integration test generator 570 may be configured to analyze a web site uploaded by a user (e.g., computing system 502), and generate an integration test based on the analysis. For example, integration test generator 570 may be configured to generate an integration test with little or no input from the user. Integration test generator 570 may include one or more RNN models and one or more genetic algorithms. RNN model may be configured to maintain a current and previous states of a given website. For example, RNN model may be trained by integration test generator 570. Integration test generator 570 may train RNN model by providing RNN model with a plurality of scripts for a plurality of web sites. RNN model may analyze the scripts for the plurality of websites to identify one or more paths contained in the website. For example, given a certain web page of a website, RNN model may learn the various ways a user may interact with the web page, the various locations a user can navigate from the web page, various dead ends of the web page, and the like. Further, RNN model may learn how to determine which paths were previously taken through the website, such that RNN model does not repeat paths. Accordingly, once trained, RNN model may be able to iterate through all possible paths of a website, while being cognizant of the current state of the website and previous states of the website. Genetic algorithms may be configured to inject randomness into the analysis performed by RNN model. In other words, genetic algorithms may provide hyperparameter tuning of RNN model.

Testing service 572 may receive a compiled integration tests from integration test generator 570. Testing service 572 may execute the compiled integration test to test and analyze the website. Although testing service 572 is shown as part of computing system 552, those skilled in the art recognize, that testing service 572 may be independent from computing system 552.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method of testing a target website, comprising:
    identifying, by a computing system, the target web site hosted by a third party server;
    inputting, by the computing system, code associated with the target web site into a recurrent neural network, wherein a genetic algorithm tunes hyperparameters of the recurrent neural network that define how the recurrent neural network simulates a user navigating the target website;
    learning, by the computing system, a first plurality of paths through the target web site in accordance with the genetic algorithm; and
    based on the learning, identifying, by the computing system, a subset of broken paths that result in an error.

2. The method of claim 1, further comprising:
    identifying, by the computing system, a uniform resource locator (URL) corresponding to the target website;
    inputting, by the computing system, further code associated with the URL into the recurrent neural network; and
    identifying, by the recurrent neural network, a second plurality of paths through the target web site, based on the learned first plurality of paths.

3. The method of claim 1, further comprising:
    determining, by the computing system, that the target website underwent an update;
    inputting, by the computing system, further code associated with the updated target website into the recurrent neural network; and
    identifying, by the recurrent neural network, a second plurality of paths through the target web site, the second plurality of paths distinct from the first plurality of paths prior to the update.

4. The method of claim 1, further comprising:
    receiving, by the computing system, a uniform resource locator (URL) corresponding to the target website;
    inputting, by the computing system, further code associated with the URL into the recurrent neural network; and
    identifying, by the recurrent neural network, a second plurality of paths through the target website, based on the learned first plurality of paths by skipping one or more sets of options of the target website that correspond to the learned subset of broken paths that result in an error.

5. The method of claim 1, wherein the hyperparameters include a speed of switching between states on the target website.

6. The method of claim 1, further comprising:
    generating, by the computing system, a plurality of integration tests for at least the target website based on the learning.

7. The method of claim 1, further comprising:
    training, by the computing system, the recurrent neural network to learn paths through websites using training data sets comprising code associated with the websites.

8. A non-transitory computer readable medium including one or more sequences of instructions that, when executed by one or more processors, causes a computing system to perform operations, comprising:
    receiving, by the computing system from a client device, a target website hosted by a third party server;
    inputting, by the computing system, code associated with the target web site into a recurrent neural network, wherein a genetic algorithm tunes hyperparameters of the recurrent neural network that define how the recurrent neural network simulates a user navigating the target website;

learning, by the computing system, a first plurality of paths through the target web site in accordance with the genetic algorithm; and based on the learning, identifying, by the computing system, a subset of broken paths that result in an error.

9. The non-transitory computer readable medium of claim 8, further comprising:

receiving, by the computing system from the client device, a uniform resource locator (URL) corresponding to the target website;

inputting, by the computing system, further code associated with the URL into the recurrent neural network; and identifying, by the recurrent neural network, a second plurality of paths through the target web site, based on the learned first plurality of paths.

10. The non-transitory computer readable medium of claim 8, further comprising:

determining, by the computing system, that the target website underwent an update;

inputting, by the computing system, further code associated with the updated target website into the recurrent neural network; and identifying, by the recurrent neural network, a second plurality of additional paths through the target web site, the second plurality of additional paths distinct from the first plurality of paths prior to the update.

11. The non-transitory computer readable medium of claim 8, further comprising:

receiving, by the computing system from the client device, a uniform resource locator (URL) corresponding to target website;

inputting, by the computing system, further code associated with the URL into the recurrent neural network; and identifying, by the recurrent neural network, a second plurality of paths through the target website, based on the learned first plurality of paths by skipping one or more sets of options of the target website that correspond to the learned subset of broken paths that result in an error.

12. The non-transitory computer readable medium of claim 8, wherein the hyperparameters include a speed of switching between states on the website.

13. The non-transitory computer readable medium of claim 8, further comprising:

generating, by the computing system, a plurality of integration tests for at least the website based on the learning.

14. The non-transitory computer readable medium of claim 8, further comprising:

training, by the computing system, the recurrent neural network to learn paths through websites using training data sets comprising code associated with the websites.

15. A system, comprising:

a processor; and a memory having programming instructions stored thereon, which, when executed by the processor, causes the system to perform operations, comprising:

identifying a target website hosted by a third party server;

inputting code associated with the target website into a recurrent neural network, wherein a genetic algorithm tunes hyperparameters of the recurrent neural network that define how the recurrent neural network simulates a user navigating the target website;

learning a first plurality of paths through the target website in accordance with the genetic algorithm; and based on the learning, identifying a subset of broken paths that result in an error.

16. The system of claim 15, wherein the operations further comprise:

identifying a uniform resource locator (URL) corresponding to the target web site;

inputting further code associated with the URL into the recurrent neural network; and identifying, by the recurrent neural network, a second plurality of paths through the target website, based on the learned first plurality of paths.

17. The system of claim 15, wherein the operations further comprise:

determining that the target website underwent an update;

inputting further code associated with the updated target website into the recurrent neural network; and identifying, by the recurrent neural network, a second plurality of paths through the target website, the second plurality of paths distinct from the first plurality of paths prior to the update.

18. The system of claim 15, wherein the operations further comprise:

identifying a uniform resource locator (URL) corresponding to the target web site;

inputting further code associated with the URL into the recurrent neural network; and identifying, by the recurrent neural network, a second plurality of paths through the target website, based on the learned first plurality of paths by skipping one or more sets of options of the target website that correspond to the learned subset of broken paths that result in an error.

19. The system of claim 15, wherein the operations further comprise:

generating a plurality of integration tests for at least the website based on the learning.

20. The system of claim 15, wherein the operations further comprise:

training the recurrent neural network to learn paths through websites using training data sets comprising code associated with the websites.

* * * * *